(12) United States Patent
Honda et al.

(10) Patent No.: US 6,950,114 B2
(45) Date of Patent: Sep. 27, 2005

(54) APPARATUS FOR COMPENSATING FOR LUMINANCE LEVEL OF VIDEO SIGNAL

(75) Inventors: Hirofumi Honda, Yamanashi (JP); Tetsuya Shigeta, Yamanashi (JP); Tetsuro Nagakubo, Yamanashi (JP)

(73) Assignee: Pioneer Corporation, Tokyo (JP)

( * ) Notice: Subject to any disclaimer, the term of this patent is extended or adjusted under 35 U.S.C. 154(b) by 325 days.

(21) Appl. No.: 09/883,965

(22) Filed: Jun. 20, 2001

(65) Prior Publication Data

US 2002/0036715 A1 Mar. 28, 2002

(30) Foreign Application Priority Data

Jun. 21, 2000 (JP) ........................................ 2000-186531

(51) Int. Cl.[7] ................................................ G09G 5/00
(52) U.S. Cl. ...................... 345/626; 345/628; 345/629; 348/671; 348/672
(58) Field of Search ................................ 345/626, 628, 345/629, 561, 589; 348/671, 672, 687, 688; 382/274, 687, 688

(56) References Cited

U.S. PATENT DOCUMENTS

| | | | | |
|---|---|---|---|---|
| 3,979,555 A | * | 9/1976 | Opittek et al. ............... | 348/672 |
| 4,672,467 A | * | 6/1987 | Heitmann ..................... | 386/39 |
| 4,746,992 A | * | 5/1988 | Hashimoto et al. ........... | 386/21 |
| 5,296,941 A | * | 3/1994 | Izawa et al. ................. | 382/169 |
| 5,426,699 A | * | 6/1995 | Wunderlich et al. ......... | 380/211 |
| 5,432,566 A | * | 7/1995 | Tanaka et al. ............... | 348/687 |
| 5,477,478 A | * | 12/1995 | Okamoto et al. ........... | 708/402 |
| 5,537,071 A | * | 7/1996 | Jaspers ....................... | 327/346 |
| 5,552,940 A | * | 9/1996 | Umemoto et al. .......... | 386/101 |
| 5,631,693 A | * | 5/1997 | Wunderlich et al. .......... | 725/91 |
| 5,699,360 A | * | 12/1997 | Nishida et al. .............. | 370/503 |
| 5,748,257 A | * | 5/1998 | Kawabata et al. .......... | 348/615 |
| 5,870,154 A | * | 2/1999 | Conover et al. ............. | 348/673 |
| 6,084,638 A | * | 7/2000 | Hare et al. .................. | 348/552 |
| 6,373,533 B1 | * | 4/2002 | Kawabata et al. .......... | 348/672 |
| 6,546,378 B1 | * | 4/2003 | Cook .......................... | 706/12 |
| 6,661,470 B1 | * | 12/2003 | Kawakami et al. ......... | 348/699 |

* cited by examiner

Primary Examiner—Jeffery Brier
Assistant Examiner—J. Amini
(74) Attorney, Agent, or Firm—Finnegan, Henderson, Farabow, Garrett & Dunner, L.L.P.

(57) ABSTRACT

A luminance level compensating apparatus passes only the luminance signal of a pixel in a first detection range in the vertical direction of an image indicated by an input luminance signal, detects and stores a first frequency for each luminance level of the passed luminance signal for each predetermined period, passes only a luminance signal of a pixel in a second detection range including the first detection range in the vertical direction of the image, detects and stores a second frequency for each luminance level of the passed luminance signal for each predetermined period; generates a mixed frequency data based on the first and second frequencies stored.

18 Claims, 7 Drawing Sheets

FIG. 2A
FIG. 2B
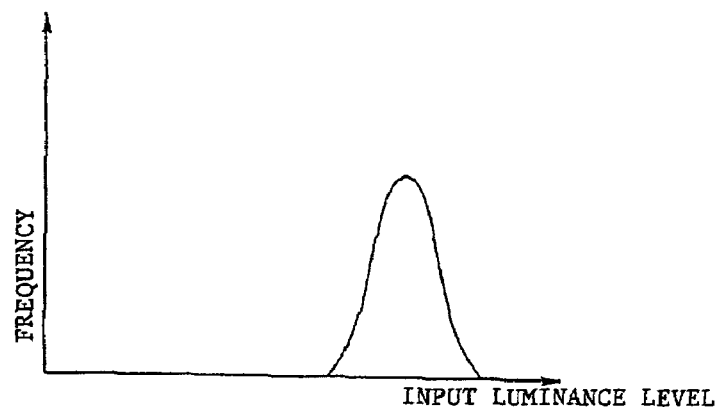
FIG. 2C
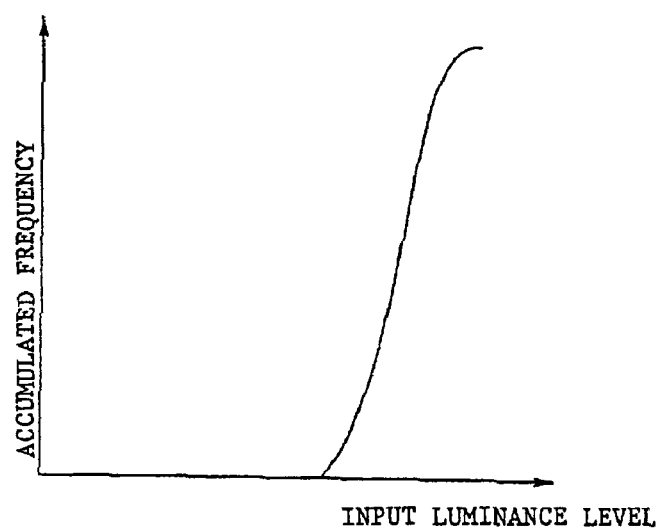
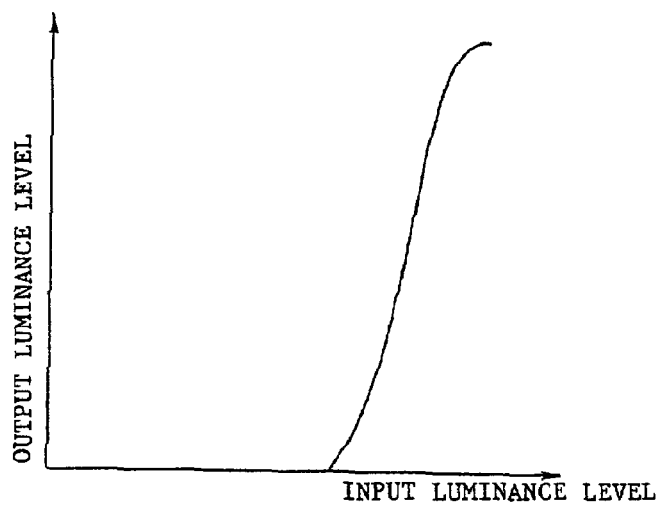

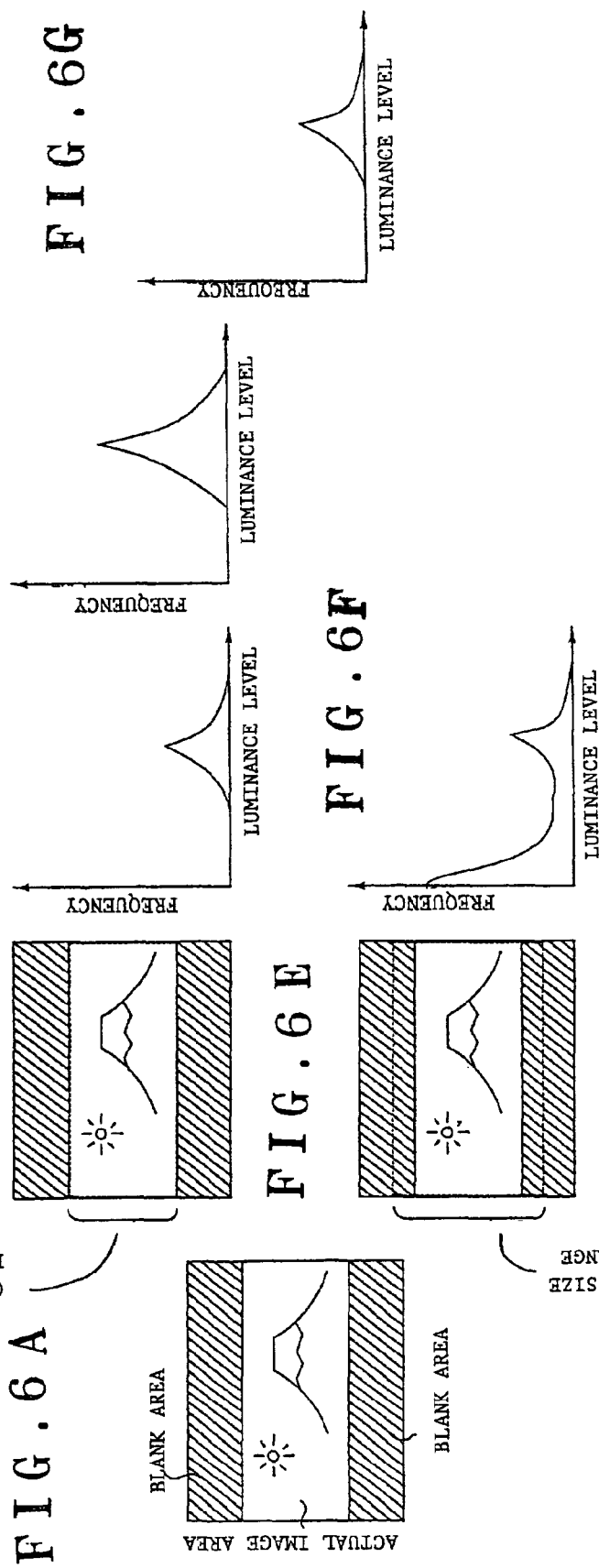

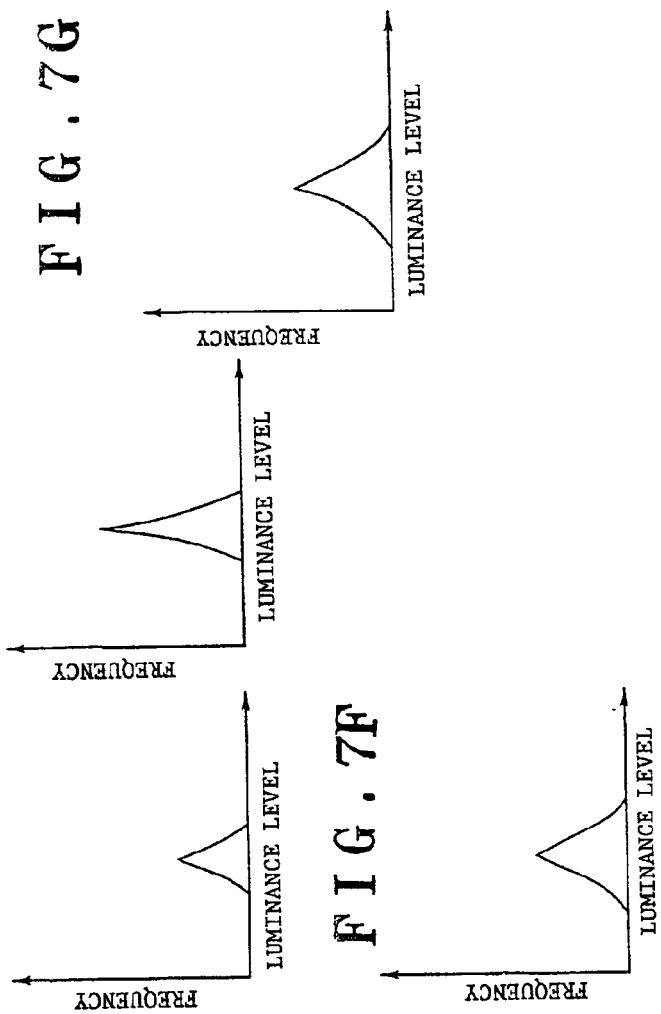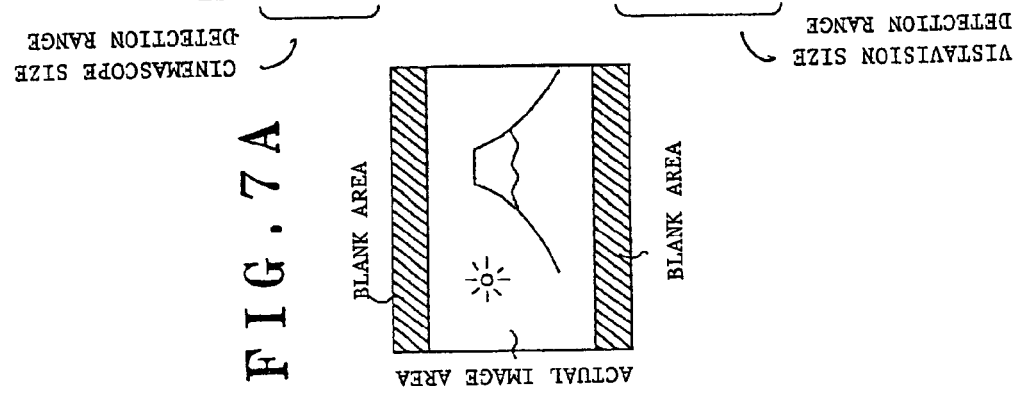

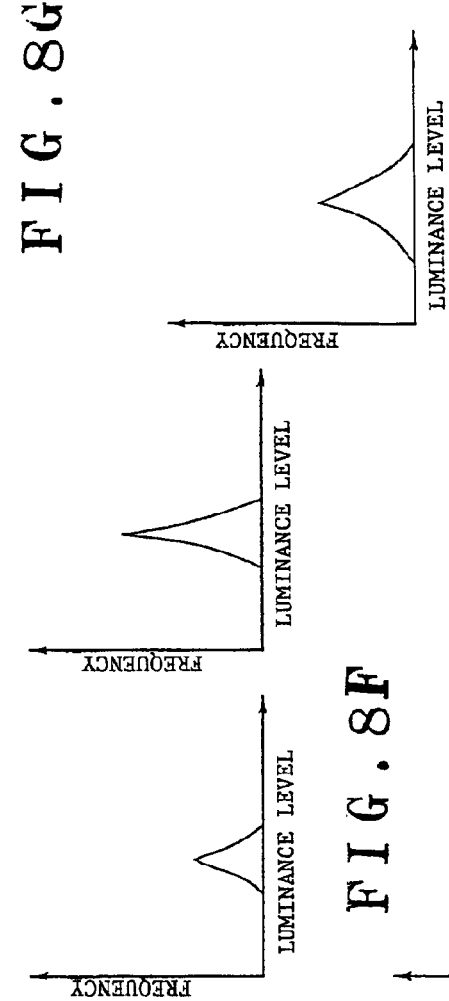
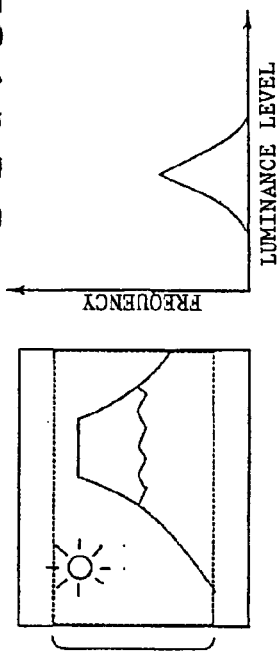
FIG. 8A
FIG. 8B
FIG. 8C
FIG. 8D
FIG. 8E
FIG. 8F
FIG. 8G

APPARATUS FOR COMPENSATING FOR LUMINANCE LEVEL OF VIDEO SIGNAL

BACKGROUND OF THE INVENTION

1. Field of the Invention

The present invention relates to an apparatus for compensating the luminance level of a video signal.

2. Description of the Related Background Art

Recently, since display units tend to be upsized, a luminance level compensating apparatus is required for displaying images more clearly. The luminance level compensating apparatus includes non-linear amplifying means for compensating the luminance level of a video signal. By supplying the video signal to the non-linear amplifying means, it is possible to extend the luminance distribution of the video signal to a dynamic range.

FIG. 1 shows a conventional luminance level compensating apparatus. The luminance level compensating apparatus includes a histogram memory 1, a maximum compensation value calculation circuit 2, and a look-up table memory 3. A digitized luminance signal as the input signal is supplied to the histogram memory 1 and the look-up table memory 3. The histogram memory 1 is a memory for storing the frequency data at each luminance level of the input luminance signal. The histogram memory has a plurality of storage areas each of which is addressed in accordance with each predetermined luminance level. The frequency data is stored in each of the storage areas. That is, at each time the luminance signal for one pixel is supplied to the histogram memory, frequency data in the storage area corresponding to that luminance level in the histogram memory increases by 1. All of the contents stored in the histogram memory 1 are cleared to zero (0) at every predetermined period (one vertical scanning period or its multiple). After clearing the histogram memory 1, new frequency data is then recorded for each luminance level.

The maximum compensation value calculation circuit 2 includes a histogram accumulation circuit 2a for accumulating data in the histogram memory 1 sequentially starting from the lowest luminance level, an accumulation histogram memory 2b for storing the result of the accumulation circuit 2a, and a normalization arithmetic circuit 2c for normalizing each data so that its maximum accumulation frequency becomes the maximum value of an output luminance signal based on data stored in the accumulation histogram memory 2b. Like the histogram memory 1, the accumulation histogram memory 2b has storage areas for storing frequencies which are addressed at the luminance level of each of a plurality of luminance levels of the luminance signal.

The look-up table memory 3 stores data obtained by normalizing data stored in the accumulation histogram memory 2b. Each address of the look-up table memory 3 is designated in accordance with a luminance level of the input luminance signal. A luminance level stored in the storage area corresponding to the designated address is output as a normalized level.

FIGS. 2A–2C show waveforms in luminance conversion by the conventional luminance level compensating apparatus. One of the addresses of the histogram memory 1 is designated for each pixel of the input luminance signal, and the frequency data value of the storage area corresponding to the designated address increases by 1. Assume that the frequency for the luminance levels of the input luminance signal in a predetermined period is detected as shown in FIG. 2A. Also, assume that the frequency at the luminance levels of $Y_{150}$, $Y_{160}$, $Y_{170}$, $Y_{180}$, $Y_{190}$, $Y_{200}$ and $Y_{210}$ is detected in the histogram memory 1. In this case, the frequency has the relationship of $Y_{150} < Y_{160} < Y_{170} < Y_{180} < Y_{190} < Y_{200} < Y_{210}$. Further, assume that the frequencies at the luminance levels of $Y_{150}$, $Y_{160}$, $Y_{170}$, $Y_{180}$, $Y_{190}$, $Y_{200}$ and $Y_{210}$ in the predetermined period are 1, 3, 5, 7, 5, 3, 1; then the accumulated frequencies at the luminance levels of $Y_{150}$, $Y_{160}$, $Y_{170}$, $Y_{180}$, $Y_{190}$, $Y_{200}$ and $Y_{210}$ are 1, 4, 9, 16, 21, 24 and 25. That is, as shown in FIG. 2B, as the luminance level increases, the accumulated frequency also increases. A normalization coefficient is calculated in the normalization arithmetic circuit 2c such that the maximum value of the accumulated frequency becomes the maximum value of an output luminance level. A normalization operation is performed on the basis of the normalization coefficient and each data value stored in the histogram memory 1. Each values obtained by the operation is stored in the corresponding storage area in the look-up table memory 3. FIG. 2C shows the relationship between the input luminance level and the output luminance level of the look-up table memory 3. By compensating the input luminance signal with reference to the look-up table memory 3, a luminance signal of which gradation is compensated is output.

However, in the conventional luminance level compensating apparatus, as an image produced by an input video signal, there is a narrow image such as the cinemascope size which is narrow in the vertical direction in an actual image. The image has blank areas (black areas) as shown by hatching in FIG. 3 at its top and bottom. Therefore, if the detection area of the accumulated histogram is an area enclosed by a dotted line A including the blank areas in FIG. 3, the accumulated histogram has the characteristic shown in FIG. 4. That is, the accumulated histogram has the frequency of the luminance level of an actual image greatly affected by the frequency of the black level of the blank areas. If the luminance level is compensated in gradation on the basis of the accumulated histogram, a problem such that black remarkably appear on the actual image occurs.

SUMMARY OF THE INVENTION

It is therefore an object of the present invention to provide a luminance level compensating apparatus which can properly compensate a luminance level in gradation in accordance with the size of an actual image area of a displayed image.

The luminance level compensating apparatus of the present invention comprises a first masking device for passing only a luminance signal corresponding to a pixel in a first detection range in the vertical direction of an image which is indicated by an input luminance signal; a second masking device for passing only a luminance signal corresponding to a pixel in a second detection range including the first detection range in the vertical direction of the image which is indicated by the input luminance signal; a first histogram memory device for detecting and storing a first frequency for each luminance level of the luminance signal output from the first masking device for each predetermined period; a second histogram memory device for detecting and storing a second frequency for each luminance level of the luminance signal output from the second masking device for each predetermined period; a frequency data mixing device for generating mixed frequency data based on each of the first and second frequencies of the first and second histogram memory devices; and a compensating device for compensating the luminance level of the input luminance signal based on the mixed frequency data.

According to the luminance level compensating apparatus of the present invention, the mixed frequency data does not contain frequency data corresponding to blank areas of the image, so that the luminance level of the input luminance signal can be properly changed by compensating the luminance level of the input luminance signal based on the mixed frequency data without being affected by the luminance level of the blank areas.

BRIEF DESCRIPTION OF THE DRAWINGS

FIGS. 2A–2C are diagrams showing characteristics for explaining an exemplary operation of the compensating apparatus in FIG. 1;

FIGS. 6A–6G are diagrams for explaining the operation of the compensating apparatus in FIG. 5 when an input video signal indicates an image of the cinemascope size;

FIGS. 7A–7G are diagrams for explaining the operation of the compensating apparatus in FIG. 5 when an input video signal indicates an image of the Vista Vision size; and FIGS. 8A–8G are diagrams for explaining the operation of the compensating apparatus in FIG. 5 when an input video signal indicates an image having an aspect ratio of 4:3.

DETAILED DESCRIPTION OF THE PREFERRED EMBODIMENT

An embodiment of the present invention will be hereinafter described in detail with reference to the attached drawings.

Figure 5:
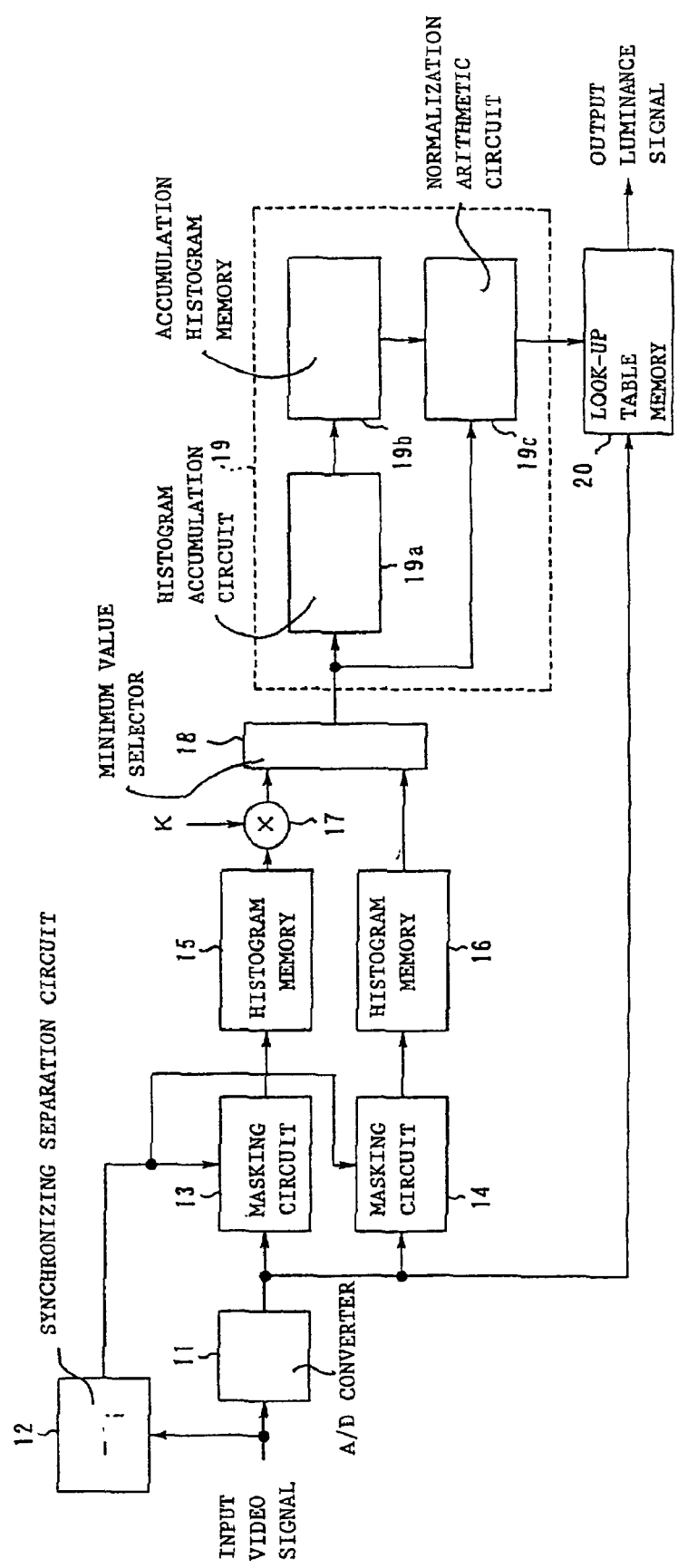
FIG. 5 is a block diagram of an embodiment of the present invention.

FIG. 5 shows a luminance level compensating apparatus according to the present invention. As shown in FIG. 5, the luminance level compensating apparatus includes an A/D converter 11, a synchronous detection circuit 12, first and second masking circuits 13 and 14, first and second histogram memories 15 and 16, a multiplier 17, a minimum value selector 18, a maximum compensation value calculation circuit 19, and a look-up table memory 20.

The A/D converter 11 converts an input video signal (composite signal) into a digital signal. The synchronous separation circuit 12 extracts a vertical synchronizing signal and a horizontal synchronizing signal from the input video signal, and sends them to the first and second masking circuits 13 and 14.

The masking circuits 13 and 14 are connected to the output of the A/D converter 11. The first masking circuit 13 sends a digital video signal in a detection range of the cinemascope size to the first histogram memory 15. The second masking circuit 14 sends a digital video signal in a detection range of the Vista Vision size to the second histogram memory 16.

As in the case of the above-mentioned histogram memory 1, the histogram memories 15 and 16 are memories for storing a frequency for each luminance level of the input luminance signal. The histogram memories 15 and 16 have storage areas which are addressed for a plurality of predetermined luminance levels. Frequency data is stored in each of the storage areas. All the frequency data stored in the histogram memories 15 and 16 are cleared to zero for each predetermined period (one vertical scanning period or its multiple), and new frequency data is then written for each of the predetermined luminance levels. The frequency data stored in each of the histogram memories 15 and 16 are read synchronously in increasing order of level before the memory 15 and 16 is cleared to zero.

The multiplier 17 is connected to the output of the first histogram memory 15. The multiplier 17 multiplies frequency data read from the first histogram memory 15 by a frequency data coefficient (for example, 2), and a result of the multiplication is sent to the minimum value selector 18.

The minimum value selector 18 compares the multiplied frequency data provided from the multiplier 17 with frequency data which is directly supplied from the histogram memory 16, and outputs smaller frequency data (frequency data for each luminance level of mixed frequency data).

Figure 1:
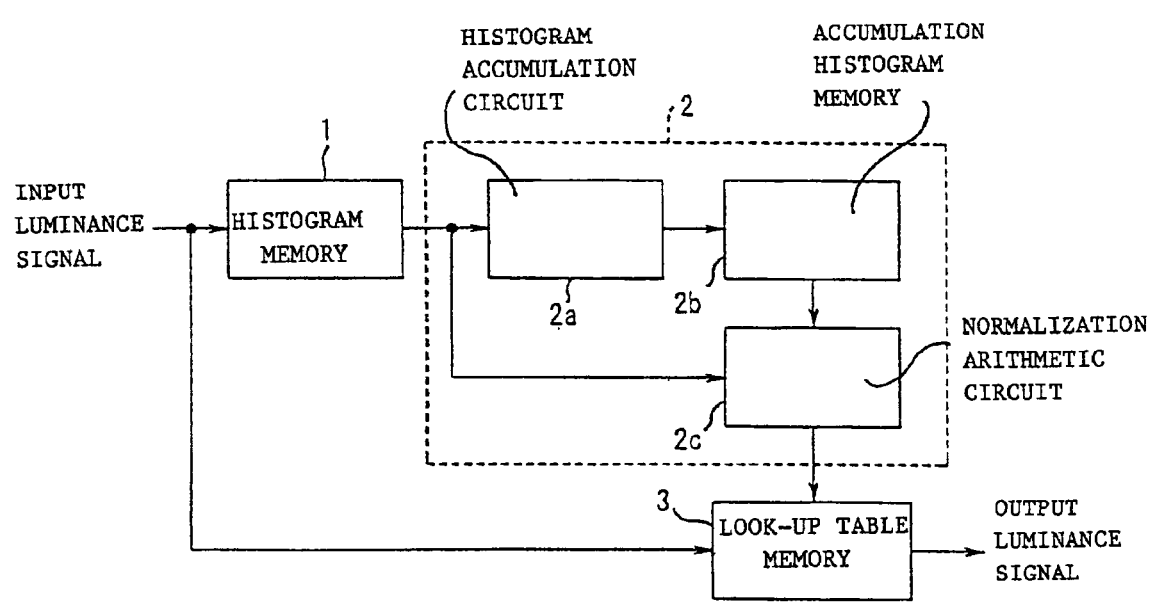
FIG. 1 is a block diagram of a conventional luminance compensating apparatus.
Figure 3:
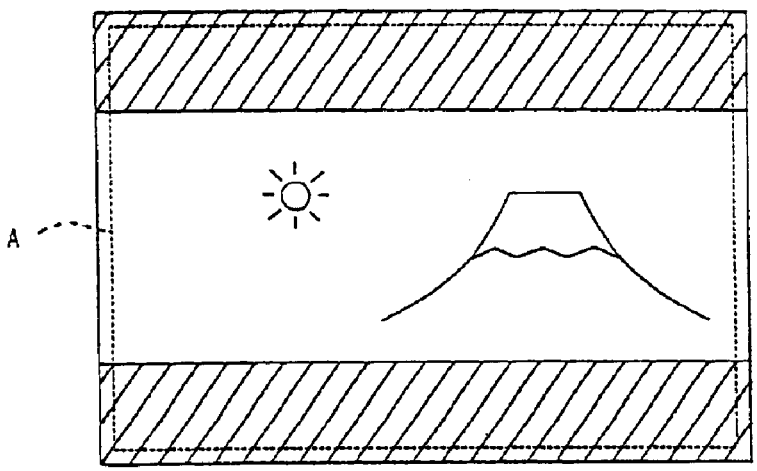
FIG. 3 shows an example of a narrow image in the vertical direction in an actual image.
Figure 4:
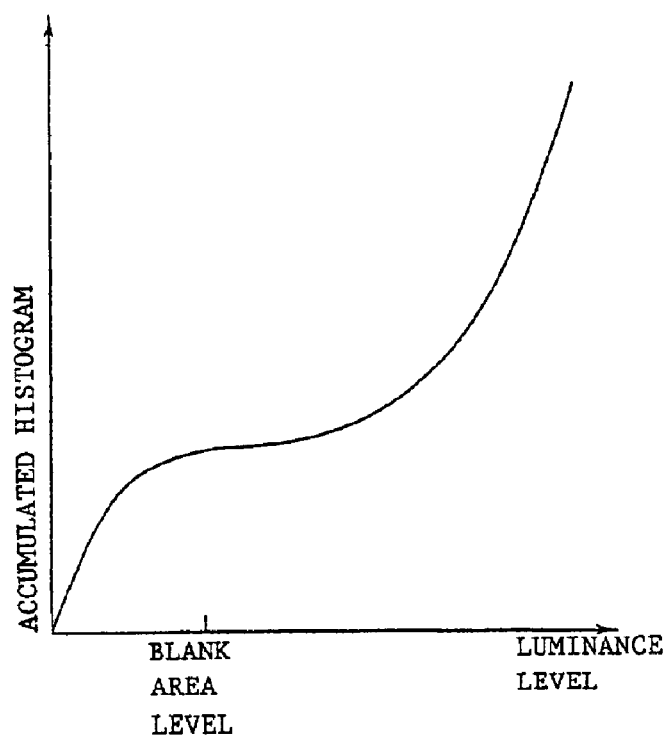
FIG. 4 shows an accumulated histogram of the luminance level of the image in FIG. 3.

As in the case of the maximum compensation value calculation circuit 2, the maximum compensation value calculation circuit 19 includes a histogram accumulation circuit 19a for accumulating frequency data in increasing order of luminance level, an accumulation histogram memory 19b for storing a result of the accumulation by the circuit 19a, and a normalization arithmetic circuit 19c for normalizing each data so that its maximum accumulation frequency becomes the maximum value of an output luminance signal based on data stored in the accumulation histogram memory 19b. The look-up table memory 20 is the same as the look-up table memory 3 in FIG. 1.

When the input video signal is a color video signal, for example, a Y-C separation circuit (not shown) may be provided in the subsequent stage of the A/D converter 11 so as to send separated luminance signals to the masking circuits 13 and 14.

Assume that an actual image indicative of an input video signal has one of three sizes, the cinemascope size, the Vista Vision size, and an aspect ratio of 4:3.

When the input video signal is an image of the cinemascope size as shown in FIG. 6A, its actual image is formed with 139 scanning lines from the 70th line through the 208th line, and the remaining scanning line portions shown by hatching in FIG. 6A are two blank areas. When the input video signal is an image of the Vista Vision size as shown in FIG. 7A, its actual image is formed with 167 scanning lines from the 56th line through the 222nd line, and the remaining scanning line portions shown by the hatching in FIG. 7A are two blank areas. When the input video signal is an image having the aspect ratio of 4:3 as shown in FIG. 8A, its actual image is formed with 199 scanning lines from the 39th line through the 237th line.

The first masking circuit 13 which is used for an image of the cinemascope size outputs a digital video signal supplied from the A/D converter 11 to the histogram memory 15 for a horizontal scanning period of 139 vertical detection range lines after passing a horizontal scanning period of 69 vertical lines which are set in response to a vertical synchronizing signal. The second masking circuit 14 which is used for an image of the Vista Vision size outputs a digital video signal supplied from the A/D converter 11 to the histogram memory 16 for a horizontal scanning period of 167 vertical detection range lines after passing a horizontal scanning period of 55 vertical lines which are set in response to a vertical synchronizing signal.

When the input video signal is an image of the cinemascope size, the first masking circuit 13 outputs a video signal for only its actual image of the cinemascope size as shown by a dashed line in FIG. 6B to the first histogram memory 15. The characteristic shown by the frequency data table which is formed in the first histogram memory 15 becomes, for example, a frequency data characteristic relating to the luminance level of the actual image as shown in FIG. 6C. The luminance-frequency characteristic shows a very small frequency at a low luminance level which corresponds to black. The luminance frequency data stored in the first histogram memory 15 is multiplied by a coefficient K by the multiplier 17, so that each frequency data value becomes, for example, two times larger, as shown in FIG. 6D.

The second masking circuit 14 supplies the histogram memory 16 with a video signal for, in addition to an actual image of the cinemascope size, an image of the Vista Vision size, including blank areas at the top and the bottom of the actual image, as shown by a dashed line in FIG. 6E. Therefore, the histogram memory 16 obtains frequency data relating to the luminance level of the black blank areas as well as the luminance level of the actual image. That is, the histogram memory 16 forms a frequency data table having frequency data counted by several times the low luminance level corresponding to black as shown in a luminance-frequency data characteristic, for example, in FIG. 6F.

The minimum value selector 18 compares the frequency data output sequentially from the multiplier 17 with the frequency data read sequentially from the second histogram memory 16, and outputs the frequency data having a smaller data value. For example, when the luminance-frequency data characteristic in FIG. 6D is compared with the luminance-frequency data characteristic in FIG. 6F, the frequency data from the multiplier 17 is selected at a low luminance level, and the frequency data from the second histogram memory 16 is mainly selected at other luminance levels. Accordingly, at the minimum value selector 18, a luminance-frequency data characteristic which is almost equal to the luminance-frequency data characteristic of the actual image of the cinemascope size in FIG. 6C can be obtained, as shown in FIG. 6G.

When the input video signal is an image of the Vista Vision size, the first masking circuit 13 supplies the first histogram memory 15 with a video signal for an actual image of the cinemascope size of the Vista Vision sized actual image, as shown by a dashed line in FIG. 7B. The characteristic of the frequency data table which is formed in the first histogram memory 15 becomes, for example, the frequency data characteristic relating to the luminance level of an actual image of the cinemascope size of the actual image of the Vista Vision size, as shown in FIG. 7C. The luminance-frequency data characteristic shows a very small frequency at the low luminance level which corresponds to black. The frequency data read from the first histogram memory 15 is multiplied by the coefficient K by the multiplier 17, so that each frequency data value becomes, for example, two times larger, as shown in FIG. 7D.

The second masking circuit 14 outputs a video signal for only an actual image of the Vista Vision size to the second histogram memory 16, as shown by a dashed line in FIG. 7E. Accordingly, the frequency data obtained in the histogram memory 16 corresponds to the luminance of the actual image only. The characteristic of the frequency data table formed in the second histogram memory 16 becomes, for example, as shown in FIG. 7F. The luminance-frequency data characteristic shows a very small frequency at the low luminance level corresponding to black.

In the case of an image of the Vista Vision size, a luminance-frequency data characteristic which is almost equal to the luminance-frequency data characteristic of the actual image of the Vista Vision size in FIG. 7F is obtained as shown in FIG. 7G, in the separating operation performed by the minimum value selector 18.

When the input video signal is an image having the aspect ratio of 4:3, the first masking circuit 13 supplies the first histogram memory 15 with a video signal for an actual image of the cinemascope size of its actual image having the aspect ratio of 4:3, as shown by the dashed line in FIG. 8B. The characteristic of the frequency data table formed in the first histogram memory 15 becomes, for example, the frequency data characteristic at the luminance level of an actual image of cinemascope size of the actual image having the aspect ratio of 4:3, as shown in FIG. 8C. The luminance-frequency data characteristic shows a very small frequency at the low luminance level corresponding to black. The frequency data read from the first histogram memory 15 is multiplied by the coefficient K by the multiplier 17, so that each frequency data value becomes, for example, two times larger, as shown in FIG. 8D.

The second masking circuit 14 supplies the second histogram memory 16 with a video signal for only an actual image of the Vista Vision size of its actual image having the aspect ratio of 4:3, as shown by a dashed line in FIG. 8E. Therefore, the histogram memory 16 obtains frequency data relating to only the luminance of the actual image. The characteristic of the frequency data table formed in the second histogram memory 16 becomes, for example, as is shown in FIG. 8F. The luminance-frequency data characteristic shows a very small frequency at the low luminance level corresponding to black.

In the case of the image having the aspect ratio of 4:3, a luminance-frequency data characteristic which is almost equal to the luminance-frequency data characteristic of the Vista Vision size of the actual image having the aspect ratio of 4:3 in FIG. 8F can be obtained as shown in FIG. 8G, in the selecting operation performed by the minimum value selector 18.

As described above, the frequency data which is output from the minimum value selector 18 to the maximum compensation value calculation circuit 19 is the frequency data at each luminance level of the actual image. Therefore, in the accumulation histogram memory 19b of the maximum compensation value calculation circuit 19, a data table of the accumulated histogram is formed by accumulating the actual image of the cinemascope size or the Vista Vision size only, without accumulating the luminance frequency of the black display level of the blank areas. The look-up table memory 20 is used for storing the normalized data of the data stored in the accumulation histogram memory 19b. The influence of the black luminance of the blank areas can be eliminated in the luminance level compensation process. That is, even in the case of an image of cinemascope size including black blank areas at the top and the bottom of an image displayed, the luminance level can be compensated without showing the black zone on the actual image. For various kinds of video signals including different sizes of an actual image such as cinemascope size and Vista Vision size, no complicated size detection circuit is required.

The above-mentioned embodiment includes a multiplier 17 for multiplying the frequency data value for each luminance level stored in the first histogram memory 15, by a certain coefficient to produce the mixed frequency data, and a minimum value selector 18 for comparing the frequency data at each luminance level output from the multiplier 17 with the frequency data stored in the second histogram memory 16 and for outputting smaller frequency data. The present invention is not limited to the configuration.

As described above, according to the present invention, for an image including blank areas at the top and bottom of an actual image such as a cinemascope sized image and a Vista Vision sized image, the frequency data for each luminance level of the actual image alone is obtained. Therefore, the luminance level of the input luminance signal can be properly compensated without being affected by the luminance level of the blank areas.

This application is based on a Japanese Application No. 2000-186531 which is hereby incorporated by reference.

What is claimed is:

1. A luminance level compensating apparatus comprising:
    a first masking device for passing only a luminance signal corresponding to a pixel in a first detection range in the vertical direction of an image which is indicated by an input luminance signal;
    a second masking device for passing only a luminance signal corresponding to a pixel in a second detection range in the vertical direction of the image which is indicated by said input luminance signal, wherein the first detection range corresponds to a first predetermined image area and the second detection range corresponds to a second predetermined image area, which is not equal to the first predetermined image area;
    a first histogram memory device for detecting and storing a first frequency data for each luminance level of the luminance signal output from said first masking device for each predetermined period;
    a second histogram memory device for detecting and storing a second frequency data for each luminance level of the luminance signal output from said second masking device for each predetermined period;
    a multiplying device for multiplying the first frequency data stored in said first histogram memory device by a coefficient;
    a selecting device for comparing the first frequency data output from said multiplying device with the second frequency data stored in said second histogram memory device and for outputting frequency data having a smaller value; and
    a compensating device for compensating the luminance level of said input luminance signal based on the outputted frequency data.

2. The luminance level compensating apparatus according to claim 1, wherein each of said first and second histogram memory devices detects and stores said first frequency data and second frequency data for each field period.

3. An apparatus for compensating luminance level of a signal, the apparatus comprising:
    a first masking circuit for masking a first predetermined image area component of a digital video signal to output a first masked signal, wherein the first predetermined image area corresponds to at least a first plurality of scanning lines in a vertical range;
    a second masking circuit for masking a second predetermined image area component, wherein the second predetermined image area component corresponds to at least a second plurality of scanning lines in the vertical range, and wherein the second predetermined image area component is not equal to the first predetermined image area component, of the digital video signal to output a second masked signal;
    a first histogram memory for storing frequency distribution data for each of a plurality of luminance levels corresponding to the first masked signal for each predetermined period;
    a second histogram memory for storing frequency distribution data for each of a plurality of luminance levels corresponding to the second masked signal for each predetermined time period;
    a multiplier for multiplying frequency distributed data output by the first histogram memory by a frequency data coefficient;
    a minimum value selector for comparing the multiplied frequency distributed data and frequency distribution data output by the second histogram memory and for outputting smaller of the multiplied frequency distribution data and the frequency distribution data output by the second histogram memory;
    an accumulator circuit for accumulating frequency distribution data output by the minimum value selector in an accumulation histogram memory; and
    a compensation circuit for compensating luminance level of the digital signal based on the accumulated frequency distribution data.

4. The apparatus of claim 3 further comprising an analog to digital converter for receiving an analog video signal and generating the digital signal.

5. The apparatus of claim further 4 comprising a synchronization separation circuit for extracting a vertical synchronizing signal and a horizontal synchronizing signal from the analog video signal and for outputting the vertical synchronizing signal and the horizontal synchronizing signal to the first masking circuit and the second masking circuit.

6. The apparatus of claim 3, wherein said first histogram memory outputs the frequency distribution data for a first predetermined period corresponding to a horizontal scanning period of a first number of vertical detection range lines, and said second histogram memory outputs the frequency distribution data for a second predetermined period corresponding to a horizontal scanning period of a second number of vertical detection range lines which includes the first number of vertical detection range lines.

7. The apparatus of claim 3, wherein the compensation circuit further comprises a normalization arithmetic circuit for normalizing the accumulated frequency distribution data.

8. The apparatus of claim 7, wherein comprising a look-up table memory for storing a normalized version of the accumulated frequency distribution data.

9. A method for compensating luminance level of a digital signal, the method comprising:
    masking a first predetermined image area component of a digital video signal to output a first masked signal using a first masking circuit, wherein the first predetermined image area component corresponds to at least a first plurality of scanning lines in a vertical range;
    masking a second predetermined image area component, wherein the second predetermined image area component corresponds to at least a second plurality of scanning lines in the vertical range, and wherein the second predetermined image area component is not equal to the first predetermined image area component of the digital video signal, to output a second masked signal using a second masking circuit;
    storing frequency distribution data for each of a plurality of luminance levels corresponding to the first masked signal for each predetermined period in a first histogram memory area;

storing second frequency distribution data for each of a plurality of luminance levels corresponding to the second masked signal for each predetermined time period in a second histogram memory area;

multiplying frequency distribution data output by the first histogram memory area by a frequency data coefficient;

comparing the multiplied frequency distributed data and frequency distribution data output by the second histogram memory area;

outputting smaller of the multiplied frequency distributed data and frequency distribution data output by the second histogram memory area;

accumulating frequency distribution data in an accumulation histogram memory; and compensating luminance level of the digital video signal based on the accumulated frequency distribution data.

10. The method of claim 9 further comprising receiving an analog video signal and generating the digital video signal using an analog to digital converter.

11. The method of claim 9 further comprising extracting a vertical synchronizing signal and a horizontal synchronizing signal from the analog video signal and outputting the vertical synchronizing signal and the horizontal synchronizing signal to the first masking circuit and the second masking circuit.

12. The method of claim 9, wherein the frequency distribution data in the first histogram memory area is output for a first predetermined period corresponding to a horizontal scanning period of a first number of vertical detection range lines, and the frequency distribution data in the second histogram memory area is output for a second predetermined period corresponding to a horizontal scanning period of a second number of vertical detection range lines which includes the first number of vertical detection range lines.

13. The method of claim 9, further comprising normalizing the accumulated frequency distribution data.

14. A system for compensating luminance level of a digital signal the system comprising:

means for masking a first predetermined image area component of a digital video signal to output a first masked signal using a first masking circuit, wherein the first predetermined image area component corresponds to at least a first plurality of scanning lines in a vertical range;

means for masking a second predetermined image area component, wherein the second predetermined image area component corresponds to at least a second plurality of scanning lines in the vertical range, and wherein the second predetermined image area component is not equal to the first predetermined image area component, of the digital video signal to output a second masked signal using a second masking circuit;

a first means for storing frequency distribution data for each of a plurality of luminance levels corresponding to the first masked signal for each predetermined period;

a second means for storing frequency distribution data for each of a plurality of luminance levels corresponding to the second masked signal for each predetermined period;

means for multiplying frequency distribution data output by the first means for storing frequency distribution data by a frequency data coefficient;

means for comparing the multiplied frequency distributed data and frequency distribution data output by the second means for storing frequency distribution data;

means for outputting smaller of the multiplied frequency distributed data and frequency distribution data output by the second means for storing frequency distribution data;

means for compensating luminance level of the digital video signal based on the accumulated frequency distribution data.

15. The system of claim 14 further comprising means for receiving an analog video signal and generating the digital video signal.

16. The apparatus of claim 14, wherein said first means outputs the frequency distribution data for a first predetermined period corresponding to a horizontal scanning period of a first number of vertical detection range lines, and said second means outputs the frequency distribution data for a second predetermined period corresponding to a horizontal scanning period of a second number of vertical detection range lines which includes the first number of vertical detection range lines.

17. The system of claim 14 further comprising means for normalizing the accumulated frequency distribution data.

18. The system of claim 17 further comprising means for storing a normalized version of the accumulated frequency distribution data.

* * * * *